United States Patent Office 3,530,666
Patented Sept. 29, 1970

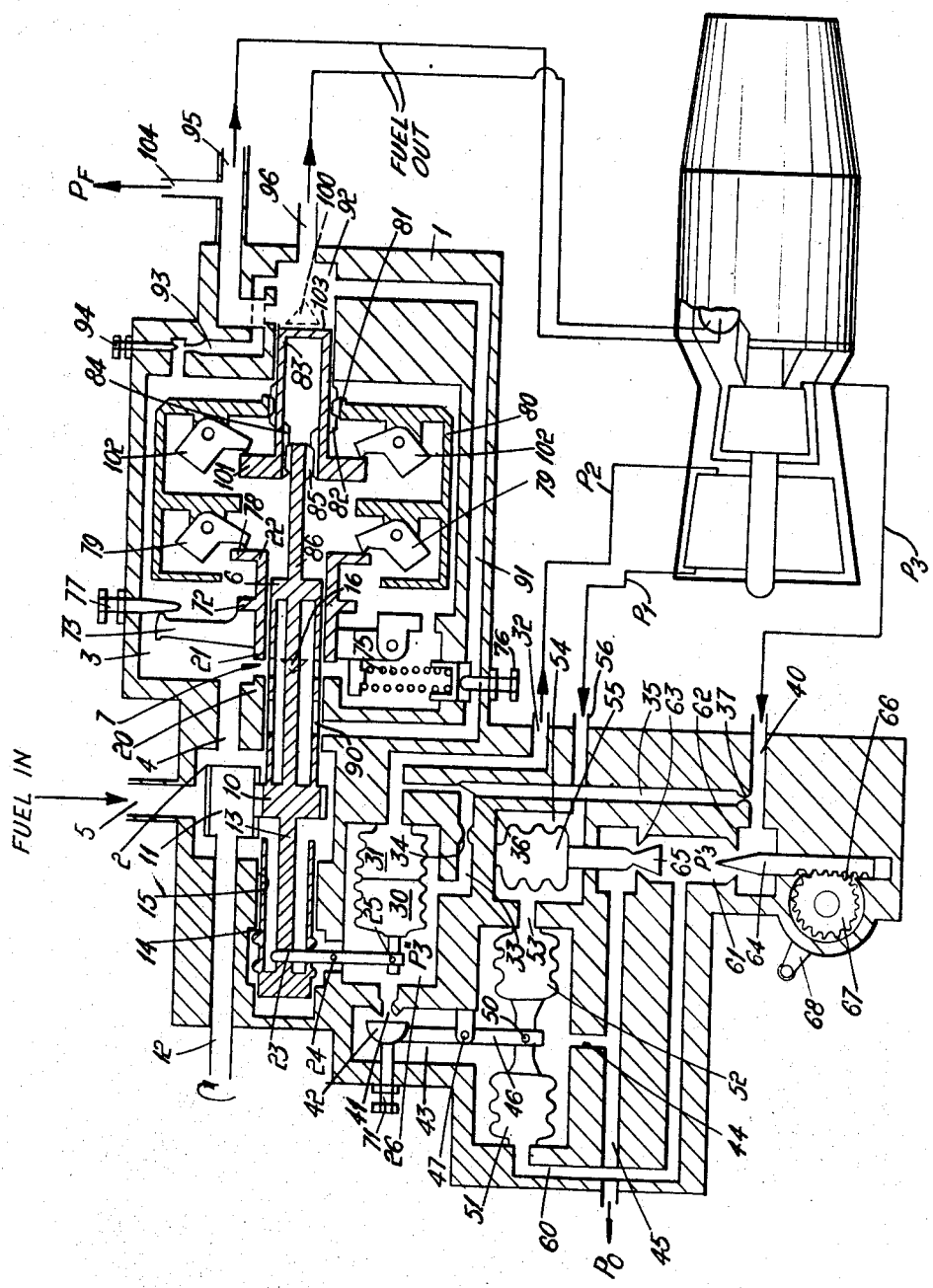

3,530,666
GAS TURBINE ENGINE FUEL SYSTEM
Walter George Cross and Wesley Boyd Edwards, Derby,
England, assignors to Rolls-Royce Limited, Derby,
England, a British company
Filed Dec. 14, 1967, Ser. No. 690,600
Claims priority, application Great Britain, Jan. 13, 1967,
2,075/67
Int. Cl. F02c 9/08, 3/06
U.S. Cl. 60—39.16
14 Claims

ABSTRACT OF THE DISCLOSURE

A gas turbine engine fuel system maintains a constant compressor ratio at any given setting of the pilot's throttle control and at any given ambient temperature altitude, and forward speed.

---

This invention concerns a gas turbine engine fuel system.

The present invention provides a gas fuel control system suitable for a multi-shaft gas turbine engine having compressor means comprising more than one relatively rotatable compressor, the system comprising a metering device to control the supply of fuel to the engine burners, means to sense the ratio of two pressures prevailing in compressor means of the engine downstream of the intake thereof and to adjust the metering device in dependence upon a function of said ratio, function adjusting means, means to communicate engine intake pressure or a pressure functionally related thereto, to the function adjusting means, means to communicate a a throttle lever position to the function adjusting means, the function adjusting means adjusting the value of said function and maintaining the overall pressure ratio of the compressor means constant at a given throttle lever setting.

The means for adjusting the metering device may comprise a bellows mounted in a bellows chamber, means being provided for respectively supplying the interior and exterior of the bellows with two pressures functionally related to said two pressures prevailing in the said compressor means, one of the said two pressures supplied to the bellows being adjustable by the function adjustment means.

The said one pressure is preferably that in the bellows chamber and is controlled by a pressure control valve.

The function adjustment means may comprise a conduit opposite ends of which are adapted to be supplied with air at ambient static pressure and at a compressor delivery pressure respectively, or at pressures functionally related thereto, the conduit having two spaced apart variable restrictors therein one of which is connected to the pilot's throttle control and the other of which is adjusted by a pressure responsive device which is responsive to engine intake pressure, and means for employing the pressure in the space in the conduit between the restrictors for adjusting the value of the said function.

The pressure in the space between the restrictors is preferably employed to control the position of the pressure control valve.

The bellows chamber preferably communicates via restrictions with a first conduit, which may be supplied with air at a pressure functionally related to a compressor delivery pressure, and with a second conduit which is open, via the said pressure control valve, to air at static ambient pressure.

The pressure control valve may be acted on in a closing direction by a pressure responsive member which is responsive to engine intake pressure, and may be acted on in an opening direction by a pressure responsive member which is open to the said pressure in the space between the restrictors.

A stop may be provided to limit opening movement of the pressure control valve.

The metering device is preferably also adjusted by means responsive to engine rotational speed.

The metering device is preferably affected by the setting of the pilot's throttle control only by reason of the effect of the said setting on the function adjustment means.

Fuel which has passed through the metering device preferably passes to an outlet chamber the flow from which is controlled by a flow control valve, the flow control valve being urged in an opening direction by means responsive to engine rotational speed and being urged in a closing direction by the pressure drop across the metering device.

The outlet chamber may be supplied with fuel which has by-passed the metering device.

The outlet chamber may communicate with main and pilot outlet passages, the flow through the main passage only being controlled by the flow control valve.

Fuel may be supplied to the fuel system by means including a pump whose output is controlled in dependence upon the pressure difference across the fuel system.

The invention also comprises a gas turbine engine provided with a fuel system as set forth above.

The invention is illustrated, merely by way of example, in the accompanying diagrammatic drawing, which is a sectional view of a gas turbine engine fuel system according to the present invention.

The terms "left" and "right" used in the description below are to be understood to refer to directions as seen in the drawing.

Referring to the drawing, a gas turbine engine fuel system comprises a block 1 having chambers 2, 3 therein which intercommunicate by way of a passage 4. High pressure fuel may be supplied to the chamber 2 through a pipe 5, the fuel being pumped through the pipe 5 towards the chamber 2 by means of a swash plate or other variable delivery pump (not shown). Alternatively, a constant delivery pump such as a gear pump (not shown) may be used in conjunction with a spill valve (not shown) whose rate of spill may be varied.

Mounted within the block 1 so as to extend into the chambers 2, 3, is an axially movable sleeve 6 which forms part of a metering device 7. The sleeve 6 is formed integrally with a gear 10 which is disposed within the chamber and which meshes with a gear 11 which is driven by an engine driven shaft 12. The gear 10 is connected by a rod 13 to a sleeve 14, which is slidably and rotatably mounted in a recess 15 in the block 1. The gear 11 is substantially longer axially than the gear 10 to permit continuous drive therebetween so as to ensure rotation of the sleeve 6 throughout axial movement thereof.

The sleeve 6 is provided with a plurality (e.g. four) of triangular orifices 16. These orifices cooperate with an annular orifice, one edge 20 of which is provided on a fixed part of the block 1 and the opposite edge 21 of which is constituted by the left hand end of an axially movable sleeve 22. The orifice 20, 21 and the orifices 16 together constitute a variable metering orifice, the effective size of which will be varied upon axial movement of one or both of the sleeves 6, 22. Thus the amount of fuel which will pass from the interior of the chamber 3 and through the said variable metering orifice 16, 20, 21 into the interior of the sleeve 6, will depend upon the relative axial positions of the sleeves 6, 22.

The axial position of the sleeve 6 is adjusted by a rod 23. The latter is pivotally mounted in the block 1 at 24, and is connected to the sleeve 14 (by a bearing structure, not shown) in such a way as to effect axial adjustment of the sleeve 14 while the latter is rotating.

The rod 23 is pivotally connected at 25 to a bellows stack mounted in a bellow chamber 26. The said bellows stack comprises an evacuated bellows 30, and a bellows 31 which is open via conduit 32 to the pressure ($P_2$) prevailing at the delivery end of a low pressure compressor (not shown) of the engine, or to a pressure functionally related thereto.

The bellows chamber 26 communicates with one end of a conduit 33 having a restriction 34 therein. The opposite end of the conduit 33 communicates with a conduit 35 opposite ends of which communicate, by way of restrictions 36, 37, with the conduit 32 and with a conduit 40. The conduit 40 is open to the pressure ($P_3$) prevailing at the delivery end of a high pressure compressor (not shown) of the engine, or to a pressure functionally related thereto. The pressure ($P''_3$) in the bellows chamber 26 is thus some function of the pressure $P_3$.

The bellows chamber 26 communicates with a vent conduit 41 the flow through which is controlled by a pressure control valve 42. The pressure control valve 42 is mounted in a bellows chamber 43 which communicates by way of a conduit 44 with a conduit 45 which is adapted to be supplied with air at ambient static pressure ($P_0$). Air will therefore tend to flow from the bellows chamber 26 through the vent conduit 41 and out through the conduit 45, and the pressure control valve 42 will thus control the value of the $P''_3$ within the bellows chamber 26.

The pressure control valve 42 is a half ball valve which is carried by and at one end of a lever 46, the lever 46 being mounted on a fixed pivot 47. The end of the lever 46 remote from the pressure control valve 42 is pivotally connected at 50 to a bellows device comprising bellows 51, 52 which are mounted within the bellows chamber 43.

The interior of the bellows 52 communicates by way of a passage 53 with a bellows chamber 54 having an evacuated bellows 55 therein. The bellows chamber 54 is open by way of a conduit 56 to a supply of air at engine intake pressure ($P_1$) or at a pressure functionally related thereto. Thus the interior of the bellows 52 is also provided with air at the engine intake pressure $P_1$, and since it is subject externally to pressure $P_0$, it senses $P_1 - P_0$ which is a function of the forward speed of the aircraft.

The interior of the bellows 51 communicates with one end of a conduit 60 whose other end communicates with a space 61. The space 61 itself communicates by way of spaced apart orifices 62, 63 respectively with the conduits 40, 45. Thus, in effect, a conduit 40, 61, 45 is provided, opposite ends of which are open to air at the ambient static pressure $P_0$, and to air at the high pressure compressor delivery pressure $P_3$.

Mounted in the orifices 62, 63 are variable restrictors 64, 65 respectively. The variable restrictor 65 is connected to the evacuated bellows 55 for movement thereby, and is therefore adjusted in response to variations in the engine intake pressure $P_1$.

The variable restrictor 64 is provided with a rack 66 which meshes with a pinion 67, the pinion 67 being adjustable by a pilot's throttle control 68. Thus the pressure ($P'_3$) in the space 61, namely the pressure between the variable restrictors 64, 65, is applied to the interior of the bellows 51 so as to urge the pressure control valve 42 in an opening direction. At the same time, of course, the pressure ($P_1$) within the bellows 52 urges the pressure control valve 42 in a closing direction.

Opening movement of the pressure control valve 42 is, however, restricted by a deceleration stop 71 which thus limits the extent to which the pressure in the bellows chamber 26 may fall and accordingly limits the extent to which the fuel passing through the metering device 7 can be reduced.

If the orifices 62, 63 are choked, then $$\frac{P_3}{P'_3} = \frac{\text{function}_1\ (P_1)}{\text{function}_2\ (\alpha)}$$

where $\alpha$ is the angle of the pilot's throttle control 68.

Since the pressure $P'_3$ is, by virtue of the arrangement of the bellows 51, 52, balanced by the pressure $P_1$ we can write $$\frac{P_3}{P_1} = \frac{\text{function}_1\ (P_1)}{\text{function}_2\ (\alpha)}$$

The function$_1$ ($P_1$) is, by selection of an appropriate profile for the variable restrictor 65, arranged to give a substantially constant overall compressor pressure ratio ($P_3/P_1$) and thus one consistent with a required thrust at a constant throttle setting and at all forward speeds, at all altitudes, and at all ambient ground temperatures below a predetermined ambient ground temperature.

The function$_2$ ($\alpha$) is selected, by choosing an appropriate profile for the variable restrictor 64, to give the required substantially constant compressor ratio $P_3/P_1$ over the full range of angles of the pilot's throttle control 68, the latter being usable to vary the setting of a turbine gas temperature control (not shown) in order to give the different temperature ratings needed for maximum take off thrust, maximum continuous thrust, and the recommended thrusts employed during cruise.

The exact profiles of the variable restrictors 64, 65 of course depend in each case upon the operating characteristics of the particular type of engine with which the fuel system is to be used. However, it is a simple matter to derive the profiles from consideration of the engine operating characteristics and the theory of gas flow through restrictors.

Thus the sleeve 6 which forms part of the metering device 7 will be adjusted by the bellows 30 and 31 in the bellows chamber 26 in dependence upon a function of the ratio of the compressor pressures $P_2$, $P_3$. Moreover, this function will be adjusted by the pressure control valve 42 in such a way that for, any given setting of the pilot's throttle control 68, and at any given forward speed, a substantially constant compressor ratio $P_3/P_1$ consistent with a required thrust will be obtained at all altitudes and at all ambient ground temperatures below a predetermined temperature.

The sleeve 22 has a flange 72 which is engaged by an arm 73 which is pivotally mounted on a bearing housing (not shown) in the block 1 at 74. The arm 73 is acted on by a spring 75 so as to urge the sleeve 22 towards the right. The tension in the spring 75 is adjustable by an adjustment member 76. Rightward travel of the sleeve 22 under the influence of the spring 75 will be limited by engagement between the arm 73 and a stop 77 which will thus act as an acceleration stop. The sleeve 22 has a flange 78 at its right hand end which is engaged by governor fly-weights 79 carried within a cylindrical housing 80 which is rotatably mounted within the chamber 3. The housing 80 has gear teeth 81 meshing with gear teeth 82 of a flow control valve 83. The flow control valve 83 is of hollow cylindrical construction and is driven internally, via splines 84, 85 by a rod 86 connected to the gear 10. Thus the flow control valve 83 and the housing 80 are rotated by the engine driven shaft 12.

Alternatively, the housing 80 may be driven independently at high speed from the engine driven shaft 12, allowing the sleeves 6 and 14 and the flow control valve 83 to be driven at low speed from the engine driven shaft 12 and so reduce wear on the sleeves 6, 14 and the flow control valve 83.

Accordingly the sleeve 22 will be urged towards the left by the governor fly-weights 79 so as to reduce the width of the orifice 20, 21 in dependence upon engine rotational speed, while the spring 75 will urge the sleeve 22 towards the right so as to tend to increase the width of the orifice 20, 21. The governor fly-weights 79 form a top speed governor, the tension in the spring 75 being pre-set so that the sleeve 22 is not moved by the governor fly-weights 79 until a predetermined top speed is exceeded.

It will, however, be noted that the metering effected by the metering device 7 is affected by the setting of the pilot's throttle control 68 only by reason of the effect of that setting on the pressure control valve 42. Thus, there is no direct mechanical connection between any part of the metering device 7 and the pilot's throttle control 68.

Fuel which has passed through the metering device 7 and thus into the interior of the sleeve 6 may pass through apertures 90 in the sleeve 6 and so to a passage 91 in the block 1.

The passage 91 extends to an outlet chamber 92 which, in addition to receiving metered fuel, also receives a supply of fuel for idling purposes. This latter supply of fuel, which by-passes the metering device 7, is derived from a passage 93 which communicates with the chamber 3 and which contains a variable idling restrictor 94.

Fuel which has reached the outlet chamber 92 may pass either to a main outlet passage 95, which extends to the main burners (not shown) of the engine, or to a pilot outlet passage 96, which extends to the pilot burners (not shown) of the engine. The flow of fuel from the outlet chamber 92 to the main outlet passage 95 is controlled by the flow control valve 83 whose axial position controls the extent to which it occludes triangular orifices 100 in the wall of the outlet chamber 92. The flow control valve 83 does not, however, affect flow from the outlet chamber 92 to the pilot outlet passage 96.

The flow control valve 83 is provided at its left hand end with a flange 101 which is engaged by governor fly-weights 102 carried by the housing 80. As will be seen from the drawing, the fly-weights 102 will urge the flow control valve 83 in an opening direction in response to increased engine rotational speed.

The flow control valve 83 has, at its right hand end, an end wall 103. The internal and external faces of the end wall 103 are respectively subjected to the pressures internally and externally of the flow control valve 83 and thus to the pressures upstream and downstream of the metering device 7. Thus, the flow control valve 83 is urged in a closing direction by the pressure drop across the metering device 7.

A pipe 104 communicates with the main outlet passage 95 and is arranged to apply the pressure $P_F$ in the latter to a servo device (not shown) which adjusts the output of the said variable delivery pump which supplies fuel to the chamber 2.

In operation, high pressure fuel enters the chamber 3 from the passage 5 and passes through the variable metering orifice 16, 20, 21 into the interior of the sleeve 6. Metered fuel then passes to the outlet chamber 92 which also receives a supply of idling fuel from the passage 93. The fuel from the outlet chamber 92 may then freely pass to the pilot outlet passage 96, and, after being throttled by the flow control valve 83, may pass to the main outlet passage 95.

The engine speed will be varied on adjustment of the pilot's throttle control 68, since this will vary the pressure $P''_3$ in the bellows chamber 26 and hence will control the amount of fuel passing through the variable metering orifice 16, 20, 21. However, for any given setting of the pilot's throttle control 68 and at any given ambient temperature, the overall compressor ratio $P_3/P_1$ will be maintained constant at all altitudes.

We claim:

1. A fuel control system suitable for a multi-shaft gas turbine engine having compressor means comprising more than one relatively rotatable compressor the system comprising a metering device to control the supply of fuel to the engine burners, means to sense the ratio of two pressures prevailing in compressor means of the engine downstream of the intake thereof, said ratio being, or being indicative of, the pressure ratio across a said relatively rotatable compressor, and to adjust the metering device in dependence upon a function of said ratio, function adjusting means, means to communicate engine intake pressure or a pressure functionally related thereto, to the function adjusting means, means to communicate a throttle lever position to the function adjusting means, the function adjusting means adjusting the value of said function and maintaining the overall pressure ratio of the compressor means constant at a given throttle lever setting.

2. A fuel system as claimed in claim 1 in which the means for adjusting the metering device comprises a bellows mounted in a bellows chamber, means being provided for respectively supplying the interior and exterior of the bellows with two pressures functionally related to said two pressure prevailing in the said compressor means, the function adjustment means being adapted to adjust one of the said two pressures supplied to the bellows.

3. A fuel system as claimed in claim 2 in which the said one pressure is that in the bellows chamber, a pressure control valve being provided to control said one pressure.

4. A fuel system as claimed in claim 3 in which the function adjustment means comprises a conduit, means to respectively supply opposite ends of the conduit with air at ambient static pressure and air at a compressor delivery pressure respectively, or at pressures functionally related thereto, the conduit having two spaced apart variable restrictors therein one of which is connected to the pilot's throttle control and the other of which is adjusted by a pressure responsive device which is responsive to engine intake pressure, and means for employing the pressure in the space in the conduit between the restrictors for adjusting the value of the said function.

5. A fuel system as claimed in claim 4 in which said means for employing the pressure in the space between the restrictors controls the position of the pressure control valve.

6. A fuel system as claimed in claim 5 in which the bellows chamber communicates via restrictions with first and second conduits, means being provided to supply said first conduit with air at a pressure functionally related to a compressor delivery pressure, said second conduit being open, via the said pressure control valve, to air at static ambient pressure.

7. A fuel system as claimed in claim 6 comprising a pressure responsive member which is responsive to engine intake pressure, and which acts in a closing direction on the pressure control valve, a further pressure responsive member, which is open to the said pressure in the space between the restrictors, acting on the pressure control valve in an opening direction.

8. A fuel system as claimed in claim 7 in which there is a stop to limit opening movement of the pressure control valve.

9. A fuel system as claimed in claim 1 comprising means responsive to engine rotational speed to adjust the metering device.

10. A fuel system as claimed in claim 1 in which the metering device is affected by the setting of the pilot's throttle control only by reason of the effect of the said setting on the function adjustment means.

11. A fuel system as claimed in claim 1 comprising an outlet chamber, means to feed thereto fuel which has passed through the metering device, a flow control valve which controls the fuel flow from the outlet chamber, the control valve being urged in an opening direction by means responsive to engine rotational speed and being urged in a closing direction by the pressure drop across the metering device.

12. A fuel system as claimed in claim 11 comprising means to supply the outlet chamber with fuel which has by-passed the metering device.

13. A fuel system as claimed in claim 11 in which the outlet chamber communicates with main and pilot outlet passages, the flow through the main passage only being controlled by the flow control valve.

14. A fuel system as claimed in claim 13 in which fuel is supplied to the fuel system by means including a pump whose output is controlled in dependence upon the pressure difference across the fuel system.

References Cited

UNITED STATES PATENTS

| | | | |
|---|---|---|---|
| 2,613,029 | 10/1952 | Wilde | 230—114 |
| 2,873,576 | 2/1959 | Lombard | 60—39.28 |
| 2,947,141 | 8/1960 | Russ | 60—39.28 |
| 2,846,846 | 8/1958 | Mock | 60—39.28 |
| 2,939,280 | 6/1960 | Farkas | 60—39.28 |
| 3,040,529 | 6/1962 | Hurtle | 60—39.28 |
| 3,091,925 | 6/1963 | May et al. | 60—39.28 |
| 3,310,939 | 3/1967 | Curran et al. | 60—39.28 |

MARK NEWMAN, Primary Examiner

U.S. Cl. X.R.

60—39.28